(No Model.)

H. H. BROWN.
SAFETY SNAP FOR CARRIAGE THILLS.

No. 376,469. Patented Jan. 17, 1888.

Witnesses
M. A. Barnes.
S. Specht.

Inventor
Harrison H. Brown.
By R. S. & A. P. Lacey
Attys.

UNITED STATES PATENT OFFICE.

HARRISON H. BROWN, OF LADOGA, WISCONSIN.

SAFETY-SNAP FOR CARRIAGE-THILLS.

SPECIFICATION forming part of Letters Patent No. 376,469, dated January 17, 1888.

Application filed October 7, 1887. Serial No. 251,739. (No model.)

*To all whom it may concern:*

Be it known that I, HARRISON H. BROWN, a citizen of the United States, residing at Ladoga, in the county of Fond du Lac and State of Wisconsin, have invented certain new and useful Improvements in Safety-Snaps for Carriage-Thills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to holdbacks for vehicles, and has for its object the construction of a device which will be simple and economical, and which will facilitate the hitching and unhitching of the animal and at the same time permit the automatic detachment of the breeching from the thills when the tugs are disengaged from the singletree.

The improvement consists, chiefly, of a hook to be attached to the thills and a snap or latch to hold the breeching in engagement with the hook, and which has the end opposite the hook beveled to permit the ring, when sufficient force is applied, to ride on said beveled end and compress the snap or latch and disengage itself from the hook.

The improvement further consists in the novel construction and arrangement of parts, more fully hereinafter set forth and claimed, and shown in the annexed drawings, in which—

Figure 1:
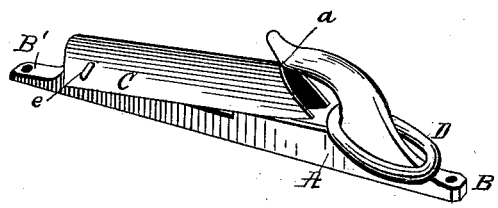
Figure 2:
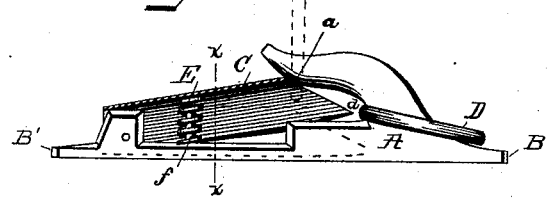
Figure 3:
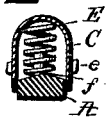
Figure 4:

Figure 1 is a perspective view of a holdback embodying my invention; Fig. 2, a side view, parts being broken away, of said holdback, showing the operation of the snap or latch by dotted lines; Fig. 3, a cross-section on the line X X of Fig. 2; Fig. 4, a perspective view of the snap.

The hook A, having its end curved outwardly from the point $a$, has front and rear extensions, B and B', respectively, which are apertured for the passage of bolts or screws to secure it to the thills in the well-known manner.

The snap or latch C has its end beveled in a corresponding direction to the end of the hook, leaving an angular space, $d$, between it and the hook for the ring D of the breeching to obtain a purchase upon said snap when moving in an opposite direction to or away from the closed end of the hook, for compressing said snap and disengaging itself from the hook, as will be readily appreciated. It is pivoted at its outer end to the hook by the pivot $e$, and is held up against the hook by a suitable spring, as the coil-spring E shown, and mounted on the lug or stud $f$, projected upward from the base of the hook. The snap is U shape in a cross-section, and its sides embrace the sides of the base of the hook, and it is formed, preferably, of sheet metal cut in the desired shape and having a portion near each edge bent to form said sides. When hitching, the ring of the breeching is placed over the end of the hook and drawn forward. This compresses the snap and permits the engagement of the ring with the hook. When unhitching, the tugs being loosened, the horse walks out of the thills, and the ring riding on the beveled end of the snap compresses it and becomes disengaged from the hook.

Having thus described my invention, what I claim, and desire to secure by Letters Patent, is—

1. The combination, with the hook having apertured end extensions, the end of the hook curving outwardly from the point $a$, of the latch or snap pivoted at its outer end and having its inner end touching the hook at $a$ and beveled downward or away from said hook, substantially as described, for the purpose specified.

2. The combination, with the hook, of the snap having sides embracing the sides of the hook.

3. The combination, with the hook and the stud projecting from the hook, of the spring mounted on the stud, and the snap having sides embracing the spring and the sides of the hook, substantially as set forth.

4. The herein described and shown holdback, composed of the hook having its end curved outwardly and having apertured end extensions, the snap having sides embracing the sides of the hook, and having its end correspondingly beveled away from the hook and pivotally connected with the hook, the stud, and the spiral spring mounted on the stud and held in place thereby, substantially as specified.

In testimony whereof I affix my signature in presence of two witnesses.

HARRISON H. BROWN.

Witnesses:
N. C. GIFFIN,
J. W. HINER.